(12) United States Patent
Teng et al.

(10) Patent No.: US 8,090,106 B2
(45) Date of Patent: Jan. 3, 2012

(54) MULTI-LEVEL DATA ENCRYPTION AND DECRYPTION SYSTEM AND METHOD THEREOF

(75) Inventors: Po-Yuan Teng, Kaohsiung (TW); Shih-I Huang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 600 days.

(21) Appl. No.: 12/242,815

(22) Filed: Sep. 30, 2008

(65) Prior Publication Data

US 2009/0323937 A1 Dec. 31, 2009

(30) Foreign Application Priority Data

Jun. 27, 2008 (TW) ................................ 97124262 A (51) Int. Cl.
*H04L 9/00* (2006.01)
(52) U.S. Cl. ............ 380/277; 380/44; 380/45; 380/270; 726/1
(58) Field of Classification Search .................... 380/43, 380/201, 239, 44, 45, 270, 277; 726/1
See application file for complete search history.

(56) References Cited

U.S. PATENT DOCUMENTS

| | | | |
|---|---|---|---|
| 2002/0131595 A1* | 9/2002 | Ueda et al. | 380/201 |
| 2002/0191796 A1 | 12/2002 | Muschenborn | |
| 2003/0002668 A1* | 1/2003 | Graunke et al. | 380/45 |
| 2007/0297607 A1* | 12/2007 | Ogura et al. | 380/239 |

* cited by examiner

*Primary Examiner* — Vivek Srivastava
*Assistant Examiner* — Thong Truong
(74) *Attorney, Agent, or Firm* — Jianq Chyun IP Office (57) ABSTRACT

A multi-level data encryption and decryption system and a method thereof are provided. The method includes dividing a data into a plurality of sub-data blocks corresponding to a plurality of user levels. The method also includes generating an encryption key for each level according to a level generation key and a time key of the level and encrypting the sub-data block of each level by using the encryption key of the level, wherein the level generation key and the time key of a lower level are generated based on the same of an upper level, the time key is generated according to a time generation key and a time seed, and the time seed is periodically updated according to different encryption periods. Thereby, the number of keys to be managed by a user is reduced while the read rights of different users are managed with forward and backward data security.

42 Claims, 3 Drawing Sheets

MULTI-LEVEL DATA ENCRYPTION AND DECRYPTION SYSTEM AND METHOD THEREOF

CROSS-REFERENCE TO RELATED APPLICATION

This application claims the priority benefit of Taiwan application serial no. 97124262, filed on Jun. 27, 2008. The entirety of the above-mentioned patent application is hereby incorporated by reference herein and made a part of this specification.

BACKGROUND OF THE INVENTION

1. Field of the Invention

The present invention generally relates to a multi-level data encryption and decryption system and a method thereof.

2. Description of Related Art

In recent years, various wireless transmission techniques, such as wireless sensor network (WSN), Zigbee, and Bluetooth, have been broadly applied to different data transmission environments thanks to the development of the wireless transmission techniques and the characteristics of wireless nodes. For example, WSN has been broadly applied to the state monitoring of different sites or objects, such as the monitoring of a shopping mall, the monitoring of environmental contamination, and the security monitoring of a construction site (for example, the construction site of a subway). To ensure the security of a monitored site or object, a wireless sensor constantly sends the state of the monitored site or object it detects back to a control center so that a user can connect to the control center and download related data to monitor the state of the monitored site or object.

Data security is a very important issue in a wireless transmission environment. Thus, the data transmitted in a wireless transmission environment is usually encrypted with a key in order to prevent unauthorized users from accessing the data. However, in a multi-user system, each user can access different data. Accordingly, multiple keys are usually used for encrypting data of different levels, and a user can use his own keys to decrypt the authorized data. In such a system, a user has to manage multiple keys, and the more levels the data is divided, the more keys the user has to manage. As a result, key management becomes very inconvenient.

Additionally, the keys are usually updated periodically to prevent a user having terminated authorization from accessing the data by using his original key or a newly authorized user from accessing previously encrypted data. Namely, in such a system, data is encrypted with different key at different time so as to achieve forward and backward data security. However, according to such a data encryption mechanism, all the encryption devices for encrypting data and all the end-user devices have to be synchronized to ensure that the encryption devices and the end-user devices use correct keys for encrypting and decrypting data. This synchronizing action increases the load of the system. Moreover, because different key is used for encrypting data at different time, both level-oriented keys and time-oriented keys have to be managed by a user. As a result, key management is made even more inconvenient.

A data encryption method is disclosed in U.S. Patent No. 2002/0191796 to resolve foregoing problems. According to this method, a data is divided into a plurality of sequential data blocks. When a data block is encrypted, the key for encrypting a next data block is encrypted together with the current data block. Thus, when a user decrypts the current data block, the user can obtain the key for decrypting the next data block, and accordingly forward and backward data security is achieved.

SUMMARY OF THE INVENTION

Accordingly, the present invention relates to a multi-level data encryption and decryption method which can manage data accessible to users of different levels.

The present invention provides a multi-level data encryption method. The multi-level data encryption method includes dividing a data to be encrypted into a plurality of sub-data blocks corresponding to a plurality of levels, wherein each of the levels is corresponding to at least one user. The multi-level data encryption method also includes generating an encryption key for each level according to a level generation key and a time key of each the level and encrypting the sub-data block of each level by using the encryption key of each the level, wherein the level generation key and the time key of a lower level are generated according to the level generation key and the time key of an upper level, the time key is generated according to a time generation key and a time seed, and the time seed is periodically updated according to different encryption periods.

The present invention provides a multi-level data decryption method. The multi-level data decryption method includes sending encrypted sub-data blocks corresponding to a level of a user and other authorized levels of the user and corresponding to an encryption period to the user. The multi-level data decryption method also includes generating encryption keys of the level and the other authorized levels according to level generation keys and time keys of the level and the other authorized levels and respectively decrypting the encrypted sub-data blocks corresponding to the level and the other authorized levels of the user by using the encryption keys of the level and the other authorized levels, wherein the level generation key and the time key of a lower level are generated according to the level generation key and the time key of an upper level, the time keys are generated according a time seed and a time generation key corresponding to the encrypted sub-data blocks, and the time seed is periodically updated according to different encryption periods.

The present invention provides a multi-level data encryption system including a data server and at least one encryption module. The data server groups a plurality of users into a plurality of levels and generates a time generation key, a time seed, and a level generation key for each of the levels, wherein the data server generates different time seed according to different encryption periods and generates the level generation key of a lower level according to the level generation key of an upper level. The encryption module receives the time generation key, the time seed, and the level generation key of each of the levels, divides a data to be encrypted into a plurality of sub-data blocks corresponding to the levels, generates an encryption key for each level according to the level generation key and the time key of each the level, and encrypts the sub-data block of each level by using the encryption key of each the level, wherein the encryption module generates the time key according to the time generation key and the time seed and generates the time key of a lower level according to the time key of an upper level.

The present invention provides a multi-level data decryption system including a data server and a decryption module. The data server stores a plurality of encrypted sub-data blocks. The decryption module reads the encrypted sub-data blocks corresponding to a level of a user and other authorized levels of the user and corresponding to an encryption period from the data server, generates encryption keys for the level and the other authorized levels according to level generation keys and time keys of the level and the other authorized levels, and decrypts the encrypted sub-data blocks by using the encryption keys of the level and the other authorized levels, wherein the level generation key and the time key of a lower level are generated according to the level generation key and the time key of an upper level. The data server generates and provides the time key corresponding to the level and the encryption period according to a time seed and a time generation key corresponding to the encrypted sub-data blocks to the decryption module, wherein the time seed is generated according to different encryption periods.

As described above, such a key generation mechanism is adopted in the present invention that the level generation key and the time key of a lower level are generated according to the level generation key and the time key of an upper level.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

Reference will now be made in detail to the present preferred exemplary embodiments of the invention, examples of which are illustrated in the accompanying drawings. Wherever possible, the same reference numbers are used in the drawings and the description to refer to the same or like parts.

According to the data encryption method provided by the present invention, a data to be encrypted is divided into a plurality of sub-data blocks corresponding to different user levels (i.e., different user groups), and the sub-data blocks of different levels are encrypted by using encryption keys generated according to level generation keys and time keys of the levels, wherein a time seed for generating the time keys various along with different encryption periods. Accordingly, users of different levels can access data according to their authorization levels and meanwhile, forward and backward data security can be achieved. In particular, the level generation key and time key of a lower level are generated according to the level generation key and time key of an upper level and as a result, the number of keys to be managed by a user is greatly reduced. Exemplary embodiments of the present invention will be described below with reference to accompanying drawings.

Figure 1:
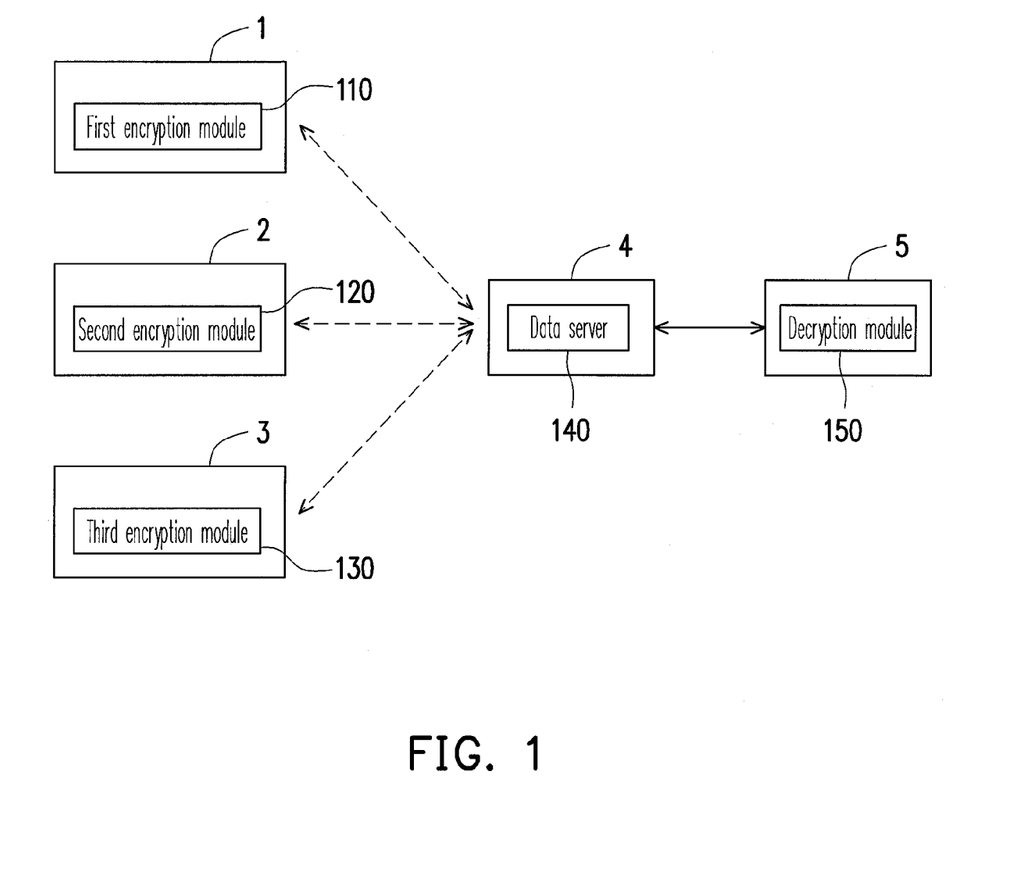
FIG. 1 is a schematic block diagram of a multi-level data encryption and decryption system according to an exemplary embodiment of the present invention.

FIG. 1 is a schematic block diagram of a multi-level data encryption and decryption system according to an exemplary embodiment of the present invention.

Referring to FIG. 1, the multi-level data encryption and decryption system 100 includes a first encryption module 110, a second encryption module 120, a third encryption module 130, and a data server 140. In the present exemplary embodiment, the multi-level data encryption and decryption system 100 is implemented based on a wireless sensor network (WSN). Thus, the first encryption module 110, the second encryption module 120, and the third encryption module 130 are respectively disposed in various device nodes, such as a first wireless sensor 1, a second wireless sensor 2, and a third wireless sensor 3, and the data server 140 is disposed in a control device 4 of the WSN. In the WSN composed of the first wireless sensor 1, the second wireless sensor 2, the third wireless sensor 3, and the control device 4, the first wireless sensor 1, the second wireless sensor 2, and the third wireless sensor 3 collect related data (for example, images) around where they are disposed, and the first wireless sensor 1, the second wireless sensor 2, and the third wireless sensor 3 respectively encrypt the data through the first encryption module 110, the second encryption module 120, and the third encryption module 130 and transmit the encrypted data to the control device 4 to be recorded so that a user can connect to the control device 4 through the network to read the data recorded therein. The operation of the WSN is well understood by those skilled in the art therefore will not be described herein. However, it should be understood that the multi-level data encryption and decryption system 100 is not limited to being deployed in a WSN; instead, the multi-level data encryption and decryption system 100 in the present invention may also be deployed in other wireless network environments, such as Zigbee and Bluetooth networks, or a wired transmission network.

The data server 140 stores the encrypted data transmitted by the first wireless sensor 1, the second wireless sensor 2, and the third wireless sensor 3 to the control device 4. The data server 140 may be a general data processing device having a data storage medium. For example, the data server 140 may include a database for managing the data stored therein.

In particular, the data server 140 groups the authorized users into a plurality of levels so as to manage these users and the data to be accessed by these users based on the levels of the users. To be specific, a user of an upper level can access more data than a user of a lower level. In other words, the users grouped into an upper level are users having higher right, and the users grouped to a lower level are users having lower right. A user having higher right can access the data assigned to users of lower rights, but a user of lower right cannot access the data assigned to users of higher rights.

In order to manage the rights of forgoing users of different levels, the data server 140 generates a level generation key for each of the levels to encrypt the data of each level. In particular, the level generation key of a lower level is generated according to the level generation key of an upper level so as to manage the data based on the user levels.

In an exemplary embodiment of the present invention, the data server 140 groups a user 11, a user 12, and a user 13 into three levels, wherein the user 11 belongs to the first level which has the highest right, the user 12 belongs to a second level which has the second highest right, and the user 13 belongs to a third level which has the lowest right.

The data server 140 randomly generate a group key $K_1$ for the users of the highest level and then sequentially generates a group key $K_2$ for the second level and a group key $K_3$ for the third level through a third function of a one-way hash chain, as shown below:

$$K_L = H^{L-1}(K_1),$$

wherein H is a hash function and L represents the level (i.e. L=1~3). In the present exemplary embodiment, the third function is to generate the group key $K_2$ of the second level and the group key $K_3$ of the third level through a hash function; however, the present invention is not limited thereto, and in another exemplary embodiment of the present invention, the third function may also be an encryption function, an XOR function, or any other suitable functions.

Next, the data server 140 respectively generates a level generation key $\{KB_{IDn,L}, n=1\sim3, L=1\sim3\}$ for each level according to the group keys $\{K_1,K_2,K_3\}$ of the levels and an identification code of the encryption module (for example, the identification codes of the first wireless sensor 1, the second wireless sensor 2, and the third wireless sensor 3 are respectively assumed to be ID1, ID2, and ID3 in the present exemplary embodiment) through a second function. In the present exemplary embodiment, an encryption function is served as the second function, as shown below:

$$KB_{IDn,L}=Enc(K_L,IDn),$$

wherein Enc is the encryption function, and L represents the level (i.e. $L=1\sim3$).

In the present exemplary embodiment, the encryption function is an encryption function conforming to the advanced encryption standard (AES); however, the present invention is not limited thereto, and any suitable encryption function, such as a function conforming to the data encryption standard (DES), can be applied to the present invention. Besides, in another exemplary embodiment of the present invention, the second function may also be implemented as a hash function, an XOR function, or other suitable functions.

It should be mentioned that in the present exemplary embodiment, the identification codes of the wireless sensors are used as one of the factors for generating the level generation keys because a different level generation key is provided to each of the wireless sensors. However, if the situation of multiple wireless sensors is not considered or every wireless sensor uses the same level generation key in another exemplary embodiment of the present invention, the group key can be directly used as the level generation key.

The data server 140 also generates a time generation key and a time seed besides the level generation keys. The time generation key and the time seed are used for generating a time key for each encryption period. In the present exemplary embodiment, a different time key is used during each encryption period so that the data to be encrypted can have forward and backward data security. Accordingly, a user having terminated authorization can be prevented from using his original key to access the data, and a newly authorized user can be prevented from accessing a previously encrypted data.

For example, the data server 140 generates the time generation key $\{TMK_{IDn}, n=1\sim3\}$ by using a primary key MK and an identification code of the wireless sensor through a sixth function. In the present exemplary embodiment, the sixth function is implemented as an encryption function, as shown below:

$$TMK_{IDn}=Enc(MK,IDn),$$

wherein Enc is the encryption function. In the present exemplary embodiment, the encryption function is an AES encryption function; however, the present invention is not limited thereto, and any suitable encryption function, such as a DES function, may also be applied to the present invention. Besides, in another exemplary embodiment of the present invention, the sixth function may also be implemented as a hash function, an XOR function, or other suitable functions.

Similarly, in the present exemplary embodiment, the identification codes of the wireless sensors are used as one of the factors for generating the time generation key because a different time generation key is provided to each wireless sensor. However, if the situation of multiple wireless sensors is not considered or each of the wireless sensors uses the same time generation key in another exemplary embodiment of the present invention, the primary key MK can be directly used as the time generation key.

In another exemplary embodiment of the present invention, the data server 140 generates a user key for each of the users and assigns the user key to the user while assigning the group key to the user. for example, the user key $UK_1$ of the user 11, the user key $UK_2$ of the user 12, and the user key $UK_3$ of the user 13 are respectively generated according to the primary key MK of the data server and a user identification code $UID_1$ of the user 11, a user identification code $UID_2$ of the user 12, and a user identification code $UID_3$ of the user 13 through an eighth function implemented as an encryption function (i.e. $UK_i=Enc(MK,UID_i$, wherein $i=1\sim3$). Similarly, in another exemplary embodiment of the present invention, the eighth function may also be implemented as a hash function, an XOR function, or other suitable functions.

In another exemplary embodiment of the present invention, the primary key MK of the data server 140 is generated randomly. Besides, the data server 140 generates a different time seed SeedT corresponding to different encryption periods T. For example, the data server 140 uses date or time as a factor for generating the time seed. In the present exemplary embodiment, the time seed SeedT corresponding to the current encryption period is generated according to the primary key MK and the current date through a seventh function implemented as an encryption function. Similarly, in another exemplary embodiment of the present invention, the seventh function may also be implemented as a hash function, an XOR function, or other suitable functions.

As described above, the first encryption module 110, the second encryption module 120, and the third encryption module 130 are used for encrypting the data to be transmitted by the first wireless sensor 1, the second wireless sensor 2, and the third wireless sensor 3. The first encryption module 110, the second encryption module 120, and the third encryption module 130 have the same structure and function, and accordingly the first encryption module 110 will be described herein as an example.

The first encryption module 110 receives the time generation key $TMK_{ID1}$, the time seed SeedT, and the level generation key $\{KB_{ID1,L}, L=1\sim3\}$ of each level from the data server 140, wherein L represents the level. In the present exemplary embodiment, the data server 140 broadcasts a new time seed SeedT at certain intervals to the first encryption module 110, the second encryption module 120, and the third encryption module 130 to allow the first encryption module 110, the second encryption module 120, and the third encryption module 130 to generate the time keys of the current encryption period T according to the new time seed and the time generation key. For example, when the first encryption module 110 receives the time seed SeedT of the current encryption period, the first encryption module 110 generates the time key $TKID_{1,T}$ for the first level in the current encryption period through a fourth function. In the present exemplary embodiment, the fourth function is implemented as a hash function, as shown below:

$$TK_{ID1,T}=H(TMK_{ID1}, SeedT),$$

wherein H is the hash function.

In particular, the first encryption module 110 generates the time key $TK_{ID1,T}$ of the first level according to the time generation key $TMK_{ID1}$ and the time seed SeedT and sequentially generates the time keys of the second level and the third level through a one-way hash chain. In other words, the first encryption module 110 generates the time key $H(TK_{ID1,T})$ of the second level according to the time key $TK_{ID1,T}$ of the first level through a fifth function implemented as a hash function and finally generates the time key $H(H(TK_{ID1,T}))$ of the third level according to the time key of the second level. In the present exemplary embodiment, the fourth function and the fifth function are implemented as hash functions; however, the present invention is not limited thereto, and in another exemplary embodiment of the present invention, the fourth function and the fifth function may also be implemented as various encryption functions, XOR functions, or other suitable functions.

The first encryption module 110 divides a data to be transmitted into a plurality of sub-data blocks corresponding to different user levels. For example, in the present exemplary embodiment, the first encryption module 110 divides the data into three sub-data blocks M1, M2, and M3 corresponding to three user levels, wherein the users of the first level are authorized to access the sub-data blocks M1, M2, and M3, the users of the second level are authorized to access the sub-data blocks M2 and M3, and the users of the third level are authorized to access the sub-data block M3.

In addition, the first encryption module 110 generates an encryption key for each level according to the received level generation key of the level and the time key generated based on a new seed. For example, in the present exemplary embodiment, the first encryption module 110 generates the encryption key $\{KE_{ID1,L,T}, L=1\sim3\}$ for each level by using the level generation key of each the level and the current time key through a first function. In the present exemplary embodiment, the first function is implemented as a hash function, as shown below:

$$KE_{ID1,L,T}=H(KB_{IDn,L}, H^{L-1}(TK_{ID1,T})),$$

wherein H is the hash function, and L represents the level. In the present exemplary embodiment, the encryption key is generated through a hash function; however, the present invention is not limited thereto, and in another exemplary embodiment of the present invention, the encryption key may be generated through an encryption function, an XOR function, or other suitable functions.

The first encryption module 110 uses the encryption key $\{KE_{ID1L,T}, L=1\sim3\}$ of each level for respectively encrypting the sub-data blocks M1, M2, and M3 so as to obtain the encrypted sub-data blocks C1, C2, and C3.

It should be mentioned that in another exemplary embodiment of the present invention, if the first encryption module 110 does not receive the new time seed but generates the time key by using the old time seed and encrypts the sub-data blocks by using the encryption key generated by using the old time key, the data server 140 determines the time seed after it receives the encrypted sub-data blocks and records the sub-data blocks which are encrypted by using the incorrect time seed as reference for subsequent data decryption. In addition, the data server 140 broadcasts the current time seed to the first encryption module 110 again if the first encryption module 110 does not use the correct time seed to encrypt the data.

In an exemplary embodiment of the present invention, the multi-level data encryption and decryption system 100 also includes a decryption module 150. After the encryption modules 110, 120, and 130 encrypt the sub-data blocks and the encrypted data is sent to the data server 140 of the control device 4 by the wireless sensors 1, 2, and 3 and stored therein, the user 11, the user 12, or the user 13 can read the encrypted sub-data blocks stored in the data server 140 through the decryption module 150 disposed in the end-user device 5. In the present exemplary embodiment, the end-user device 5 is connected to the control device 4 through a wired network. However, the present invention is not limited thereto, and in another exemplary embodiment of the present invention, the end-user device 5 may also be connected to the control device 4 through a wireless network.

The decryption module 150 reads the encrypted sub-data blocks corresponding to the level of a user (for example, the user 11, the user 12, or the user 13) and other authorized levels of the user and corresponding to the encryption period from the data server 140. To be specific, in the present exemplary embodiment, a user having higher right can read the data assigned to users having lower rights but a user having lower right cannot read the data assigned to users having higher rights. Thus, the data server 140 provides the corresponding authorized data to a user according to the level of the user after it authenticates the user according to a user key of the user.

For example, in the present exemplary embodiment, when the user 12 inputs a user key $UK_2$ through the end-user device 5 to read the sub-data blocks encrypted by the first wireless sensor 1 during the encryption period T, since the user 12 belongs to the second level, the data server 140 provides the encrypted sub-data blocks corresponding to the second level and the third level (for example, the sub-data blocks C2 and C3) to the decryption module 150 of the end-user device 5.

In the present exemplary embodiment, the data server 140 generates a time key corresponding to the level of the user and sends the time key together with the encrypted sub-data blocks to the decryption module 150 of the end-user device 5. For example, the data server 140 generates the time key of the highest level according to a time seed and a time generation key corresponding to the encrypted sub-data blocks through a hash function and generates the time key corresponding to the level of the user through a one-way hash chain.

The decryption module 150 generates the encryption keys for the authorized levels (i.e., the second level and the third level) of the user according to the level generation keys and the time keys of the authorized levels and decrypts the encrypted sub-data blocks by using the encryption keys. In particular, the decryption module 150 generates the level generation key and the time key of a lower level according to the level generation key and the time key of an upper level.

For example, when the user 12 inputs the user key $UK_2$ through the end-user device 5 to read the sub-data blocks encrypted by the first wireless sensor 1 during the encryption period T, the decryption module 150 generate the level generation key $KB_{ID1,2}$ of the second level according to the group key $K_2$ of the user 12 and an identification code ID1 of the encryption module (i.e., the first wireless sensor 1) for encrypting the received sub-data blocks. Besides, the decryption module 150 generates the group key $K_3$ by using the group key $K_2$ of the user 12 through a hash function and generate the level generation key $KB_{ID1,3}$ of the third level according to the group key $K_3$ and the identification code ID 1 of the first wireless sensor 1. Meanwhile, the decryption module 150 generates the time key $H(H(TK_{ID1,T}))$ of the third level according to the time key $H(TK_{ID1,T})$ corresponding to the level of the user 12 (i.e., the second level) received from the data server 140. Accordingly, the decryption module 150 generates the encryption keys for the authorized levels (i.e., the second level and the third level) of the user according to the level generation keys and the time keys of the authorized levels of the user 12.

Figure 2:
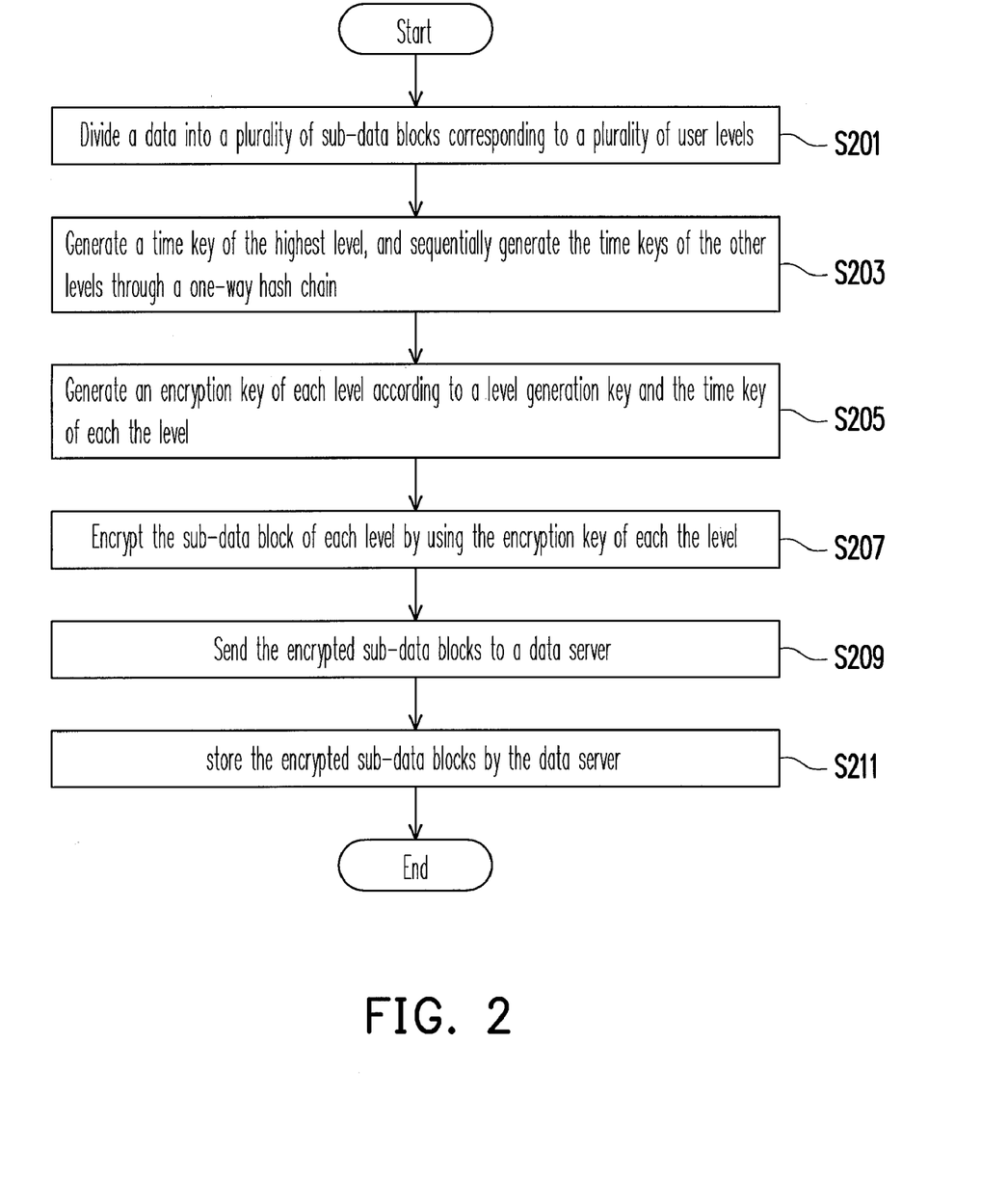
FIG. 2 is a flowchart of a multi-level data encryption method according to an exemplary embodiment of the present invention.
Figure 3:
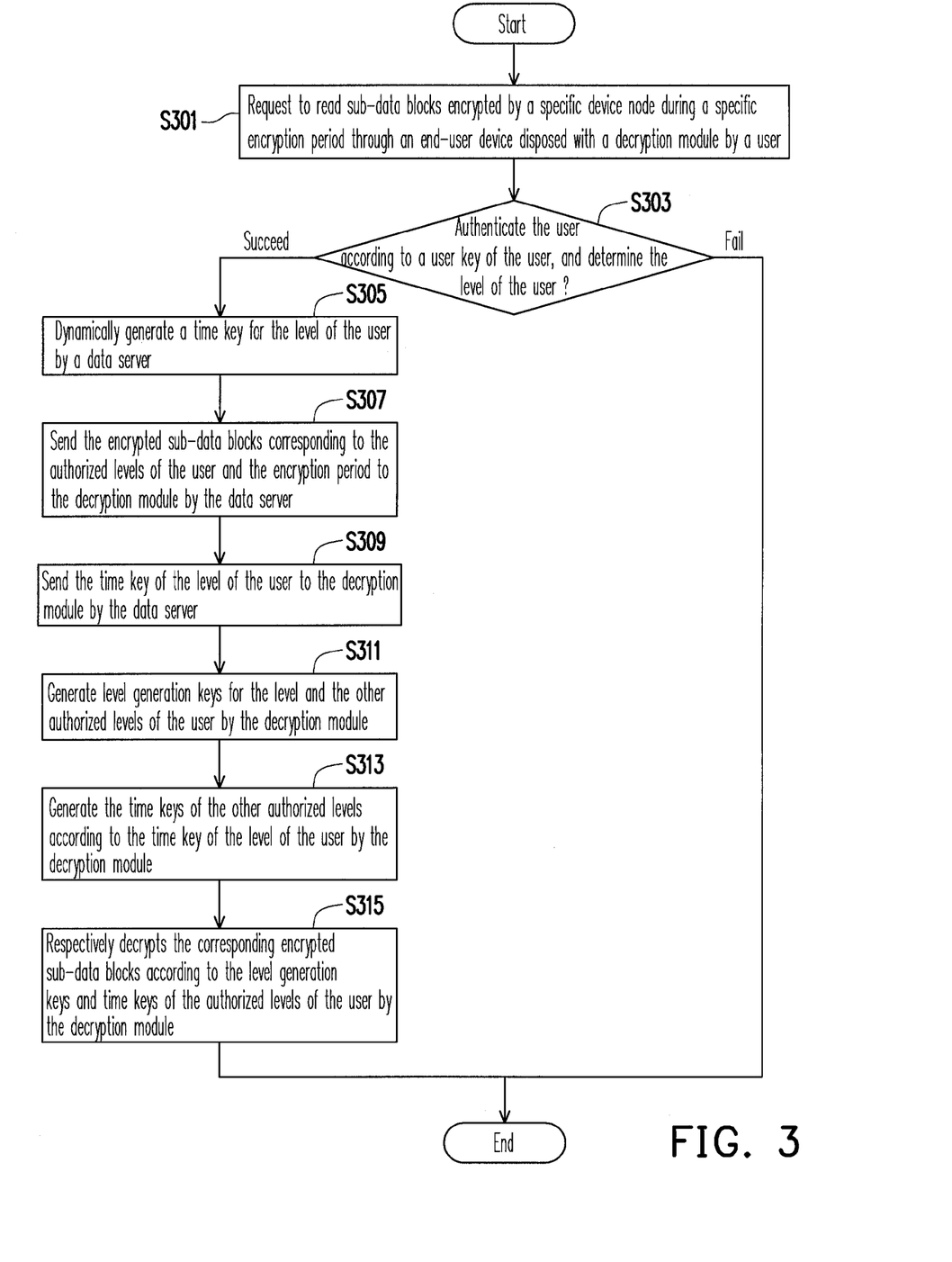
FIG. 3 is a flowchart of a multi-level data decryption method according to an exemplary embodiment of the present invention.

FIG. 2 is a flowchart of a multi-level data encryption method according to an exemplary embodiment of the present invention, and FIG. 3 is a flowchart of a multi-level data decryption method according to an exemplary embodiment of the present invention.

To describe the steps in FIG. 2 and FIG. 3 conveniently, the encryption and decryption method in the present exemplary embodiment will be described below by taking a complete data encryption and decryption procedure as an example. In this example, the first wireless sensor 1 sends a data sensed during an encryption period T to the control device 4, and later on the user 12 reads the data sensed by the first wireless sensor 1 during the encryption period T from the control device 4.

Referring to FIG. 2, in step S201, the first encryption module 110 of the first wireless sensor 1 divides the data into a plurality of sub-data blocks M1, M2, and M3 corresponding to different user levels.

In step S203, the first encryption module 110 generates a time key for the highest level (i.e., the first level) according to the current time seed SeedT and sequentially generates time keys for the second level and the third level through a one-way hash chain (i.e., the fourth function), wherein the data server 140 broadcasts the current time seed periodically.

Next, in step S205, the first encryption module 110 generates an encryption key for each level according to a level generation key and the time key of the each level, wherein the data server 140 generates the level generation key of a lower level according to the level generation key of an upper level. The method for generating the level generation keys has been described above therefore will not be described herein.

In step S207, the first encryption module 110 encrypts the sub-data block of each level according to the encryption key of each the level.

Finally, in step S209, the first wireless sensor 1 sends the encrypted sub-data blocks C1, C2, and C3 to the control device 4, and in step S211, the data server 140 stores the encrypted sub-data blocks C1, C2, and C3.

It should be mentioned that when the multi-level data encryption and decryption system 100 initializes, the data server 140 sends the level generation key and the time generation key used by the encryption module of each wireless sensor for encrypting data to the wireless sensor, and later on the data server 140 periodically broadcasts the new time seed so that the encryption module of each wireless sensor can generate the encryption key for encrypting data as described above.

Next, referring to FIG. 3, in step S301, the user 12 requests to read the encrypted sub-data blocks sensed by the first wireless sensor 1 during the encryption period T through the end-user device disposed with the decryption module 150.

In step S303, the identification of the user 12 is authenticated according to the user key $UK_2$ of the user 12, and the level of the user 12 is determined.

The multi-level data decryption procedure is terminated if the authentication in step S303 fails. If the authentication in step S303 succeeds, then in step S305, the data server 140 dynamically calculates the time seed used during the encryption period T, dynamically calculates the time generation key according to a primary key and the identification code ID1 of the first wireless sensor 1, dynamically calculates the time key of the first level according to the time generation key and the time seed through a hash function (i.e., the fourth function), and calculates the time key of the level of the user 12 through a one-way hash chain (i.e., the fifth function).

In step S307, the data server 140 sends the encrypted sub-data blocks corresponding to the authorized levels of the user 12 and corresponding to the encryption period T to the decryption module 150. Meanwhile, in step S309, the data server 140 sends the time key of the level of the user 12 to the decryption module 150. In another exemplary embodiment of the present invention, the time key of the level of the user 12 may also be encrypted by using the user key $UK_2$ before it is sent to the decryption module 150.

Thereafter, in step S311, the decryption module 150 generates the group key of the third level according to the group key of the user 12 (i.e., the second level) through a hash function (i.e., the third function) and generates the level generation keys of the second level and the third level according to the group keys of the second level and the third level through a second function. In step S313, the decryption module 150 generates the time key of the third level according to the time key of the level of the user 12 through a hash function (i.e., the fifth function).

Finally, in step S315, the decryption module 150 respectively decrypts the corresponding encrypted sub-data blocks according to the level generation keys and the time keys of the authorized levels (i.e., the second level and the third level) of the user 12 through the first function.

It has to be understood that in the present exemplary embodiment, the first to the seventh functions are respectively implemented as a hash function and an encryption function for generating the user key, the group keys, the primary key, the time seed, the time generation key, the level generation keys, and the encryption keys; however, any other suitable function may also be applied in the present invention without departing from the spirit and scope of the present invention.

In overview, in the present invention, data is encrypted corresponding to multiple levels so that a user having higher right can access the data assigned to users having lower rights but a user having lower right cannot access data assigned to users having higher rights. In addition, in the present invention, a time key updated by using a time seed is adopted to ensure the encrypted data to have forward and backward security and that no synchronization is required. Thus, the calculation complexity of the encryption system is reduced. Moreover, in the present invention, the level generation key and the time key of a lower level are generated according to the level generation key and the time key of an upper level. Thereby, the number of keys to be managed by an end-user device is reduced and accordingly the calculation load of the end-user device is also reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A multi-level data encryption method, comprising:
dividing a data into a plurality of sub-data blocks according to a plurality of levels, wherein each of the levels is corresponding to at least one user;
receiving a level generation key of each the level, a time generation key and a time seed from a data server by a wireless sensor, wherein the level generation key of each the level, the time generation key and the time seed are generated by the data server;
generating a time key of each the level according to the time generation key and the time seed by the wireless sensor;
generating an encryption key for each of the levels according to the level generation key and the time key of each the level by the wireless sensor; and respectively encrypting the sub-data blocks of the levels by using the encryption keys of the levels by the wireless sensor, wherein the level generation key and the time key of a lower level are generated according to the level generation key and the time key of an upper level, and the time seed is periodically updated by the data server according to different encryption periods.

2. The multi-level data encryption method according to claim 1, wherein the step of generating the encryption key for each of the levels according to the level generation key and the time key of each the level comprises generating the encryption key for each of the levels through a first function.

3. The multi-level data encryption method according to claim 2, further comprising:

generating the level generation key of each of the levels according to a group key of the level and an identification code of a device node through a second function, wherein the sub-data blocks are encrypted by the device node, and generating the group key of a lower level according to the group key of an upper level through a third function, wherein the group key of the highest level is generated randomly; and generating the time key of the highest level according to the time generation key and the time seed through a fourth function, and generating the time key of a lower level according to the time key of an upper level through a fifth function.

4. The multi-level data encryption method according to claim 3, further comprising generating the time generation key according to a primary key and the identification code of the device node through a sixth function.

5. The multi-level data encryption method according to claim 4, further comprising generating the time seed according to the primary key and an identifier corresponding to the encryption period through a seventh function.

6. The multi-level data encryption method according to claim 5, further comprising respectively generating user keys of the users according to the primary key and identification codes of the users through an eighth function.

7. The multi-level data encryption method according to claim 6, wherein the first function, the second function, the third function, the fourth function, the fifth function, the sixth function, the seventh function, and the eighth function respectively comprise an encryption function, a hash function, or an XOR function.

8. The multi-level data encryption method according to claim 7, wherein the encryption function comprises an encryption function conforming to the advance encryption standard (AES) or an encryption function conforming to the data encryption standard (DES).

9. The multi-level data encryption method according to claim 4, further comprising generating the primary key randomly.

10. The multi-level data encryption method according to claim 1, further comprising recording the sub-data blocks which are not encrypted by using the latest time seed.

11. A multi-level data decryption method, comprising:

sending encrypted sub-data blocks, which is corresponding to a level of a user and other authorized levels of the user and corresponding to an encryption period, and a time key corresponding to the level of the user to an end-user device of the user by a data server, wherein the time key corresponding to the level of the user is generated by the data server according to a time seed and a time generation key corresponding to the encrypted sub-data blocks;

generating time keys of the other authorized levels according to the time key by the end-user device;

generating encryption keys for the level and the other authorized levels according to level generation keys and the time keys of the level and the other authorized levels by the end-user device; and respectively decrypting the encrypted sub-data blocks of the level and the other authorize levels by using the encryption keys of the level and the other authorized levels by the end-user device, wherein the level generation key and the time key of a lower level are generated according to the level generation key and the time key of an upper level, and the time seed is periodically updated according to different encryption periods.

12. The multi-level data decryption method according to claim 11, wherein the step of generating the encryption keys of the level and the other authorized levels according to the level generation keys and the time keys of the level and the other authorized levels comprises generating the encryption keys of the level and the authorized levels through a first function.

13. The multi-level data decryption method according to claim 12, wherein the time key of the highest level is generated according to the time generation key and the time seed through a fourth function, and the time key of a lower level is generated according to the time key of an upper level through a fifth function; and generating the level generation keys of the level and the other authorized levels according to group keys of the level and the other authorized levels and an identification code of a device node through a second function, wherein the encrypted sub-data blocks are encrypted by the device node and the group keys of the other authorized levels are generated according to the group key of the level through a third function.

14. The multi-level data decryption method according to claim 13, further comprising generating the time generation key according to a primary key and the identification code of the device node through a sixth function.

15. The multi-level data decryption method according to claim 14, further comprising generating the time seed according to the primary key and an identifier corresponding to the encryption period through a seventh function.

16. The multi-level data decryption method according to claim 15, further comprising authenticating the user according to a user key of the user, wherein the user key of the user is generated according to the primary key and an identification code of the user through an eighth function.

17. The multi-level data decryption method according to claim 16, wherein the first function, the second function, the third function, the fourth function, the fifth function, the sixth function, the seventh function, and the eighth function respectively comprise an encryption function, a hash function, or an XOR function.

18. The multi-level data decryption method according to claim 17, wherein the encryption function comprises an encryption function conforming to the AES or an encryption function conforming to the DES.

19. The multi-level data decryption method according to claim 14, further comprising generating the primary key randomly.

20. The multi-level data decryption method according to claim 11, further comprising determining whether the encrypted sub-data blocks are encrypted according to the time seed corresponding to the encryption period.

21. A multi-level data encryption system, comprising:
a data server, for grouping a plurality of users into a plurality of levels and generating a time generation key, a time seed, and a level generation key for each of the levels, wherein the data server generates different time seed according to different encryption periods and generates the level generation key of a lower level according to the level generation key of an upper level; and
at least one wireless sensor, having an encryption module, wherein the encryption module is configured for receiving the time generation key, the time seed, and the level generation key of each of the levels from the data server, dividing a data into a plurality of sub-data blocks corresponding to the levels, generating an encryption key for each of the levels according to the level generation key and the time key of each the level, and encrypting the sub-data block of each of the levels by using the encryption key of each the level, wherein the encryption module generates the time key according to the time generation key and the time seed and generates the time key of a lower level according to the time key of an upper level.

22. The multi-level data encryption system according to claim 21, wherein the encryption module further generates the encryption key of each of the levels according to the level generation key and the time key of the each level through a first function.

23. The multi-level data encryption system according to claim 22, wherein the data server generates a group key of the highest level randomly, generates the group key of a lower level according to the group key of an upper level through a second function, and generates the level generation key for each of the levels according to the group key of the level and an identification code of the encryption module through a third function, and
the encryption module generates the time key of the highest level according to the time generation key and the time seed through a fourth function and generates the time key of a lower level according to the time key of an upper level through a fifth function.

24. The multi-level data encryption system according to claim 23, wherein the data server generates the time generation key according to a primary key and an identification code of a device node in which the encryption module is disposed through a sixth function.

25. The multi-level data encryption system according to claim 24, wherein the data server generates the time seed according to the primary key and an identifier corresponding to the encryption period through a seventh function.

26. The multi-level data encryption system according to claim 25, wherein the data server respectively generates user keys the users according to the primary key and an identification code of the users through an eighth function.

27. The multi-level data encryption system according to claim 26, wherein the first function, the second function, the third function, the fourth function, the fifth function, the sixth function, the seventh function, and the eighth function respectively comprise an encryption function, a hash function, or an XOR function.

28. The multi-level data encryption system according to claim 27, wherein the encryption function comprises an encryption function conforming to the AES and an encryption function conforming to the DES.

29. The multi-level data encryption system according to claim 24, wherein the data server generates the primary key randomly.

30. The multi-level data encryption system according to claim 21, wherein the data server stores the sub-data blocks encrypted by the encryption module.

31. The multi-level data encryption system according to claim 21, wherein the data server records the sub-data blocks which are not encrypted by using the latest time seed.

32. A multi-level data decryption system, comprising:
a data server, for storing a plurality of encrypted sub-data blocks; and
an end-user device, having a decryption module, wherein the decryption module is configured for reading encrypted sub-data blocks, which is corresponding to a level of a user and other authorized levels of the user and corresponding to an encryption period, and a time key corresponding to the level of the user from the data server, wherein the time key is generated by the data server,
wherein the end-user device is configured for generating time keys of the other authorized levels according to the time key by the end-user device, generating encryption keys for the level and the other authorized levels according to level generation keys and the time keys of the level and the other authorized levels, and decrypting the encrypted sub-data blocks by using the encryption keys of the level and the other authorized levels, wherein the level generation key and the time key of a lower level are generated according to the level generation key and the time key of an upper level,
wherein the data server generates and provides the time key corresponding to the level and the encryption period according to a time seed and a time generation key corresponding to the encrypted sub-data blocks to the decryption module, wherein the time seed is generated according to different encryption periods.

33. The multi-level data decryption system according to claim 32, wherein the decryption module further generates the encryption keys for the level and the other authorized levels according to the level generation keys and the time keys of the level and the other authorized levels through a first function.

34. The multi-level data decryption system according to claim 33, wherein the data server generates the time key of the highest level according to the time generation key and the time seed through a fourth function and generates the time key corresponding to the level through a fifth function.

35. The multi-level data decryption system according to claim 34, wherein the decryption module generates the time keys of the other authorized levels according to the time key of the level through the fifth function, and
the decryption module generates the level generation keys of the level and the other authorized levels according to group keys of the level and the other authorized levels and an identification code of a device node through a second function, wherein the encrypted sub-data blocks are encrypted by the device node and the group keys of the other authorized levels are generated according to the group key of the level through a third function.

36. The multi-level data decryption system according to claim 35, wherein the data server generates the time generation key according to a primary key and the identification code of the device node through a sixth function.

37. The multi-level data decryption system according to claim 36, wherein the data server generates the time seed according to the primary key and an identifier corresponding to the encryption period through a seventh function.

38. The multi-level data decryption system according to claim 37, wherein the data server authenticates the user according to a user key of the user, wherein the user key of the user is generated according to the primary key and an identification code of the user through an eighth function.

39. The multi-level data decryption system according to claim 38, wherein the first function, the second function, the third function, the fourth function, the fifth function, the sixth function, the seventh function, and the eighth function respectively comprise an encryption function, a hash function, or an XOR function.

40. The multi-level data decryption system according to claim 39, wherein the encryption function comprises an encryption function conforming to the AES and a function conforming to the DES.

41. The multi-level data decryption system according to claim 36, wherein a key generation unit of the data server generates the primary key randomly.

42. The multi-level data decryption system according to claim 32, wherein the data server determines whether the encrypted sub-data blocks are encrypted by using the time seed corresponding to the encryption period.

* * * * *